United States Patent [19]
Ochoa et al.

[11] Patent Number: 5,798,939
[45] Date of Patent: Aug. 25, 1998

[54] SYSTEM FOR OPTIMIZING POWER NETWORK DESIGN RELIABILITY

[75] Inventors: J. Rafael Ochoa; Robert L. Hirt, both of Cary, N.C.

[73] Assignee: ABB Power T&D Company, Inc., Raleigh, N.C.

[21] Appl. No.: 950,333

[22] Filed: Oct. 14, 1997

Related U.S. Application Data

[63] Continuation of Ser. No. 414,574, Mar. 31, 1995, abandoned.

[51] Int. Cl.[6] .................................................. G06F 17/00
[52] U.S. Cl. .......................... 364/493; 364/492; 364/483; 364/578
[58] Field of Search .............................. 364/493, 492, 364/483, 578

[56] References Cited

U.S. PATENT DOCUMENTS

| | | | |
|---|---|---|---|
| 3,857,027 | 12/1974 | Carlson et al. | 364/578 |
| 3,886,330 | 5/1975 | Egelston et al. | 364/492 |
| 4,464,724 | 8/1984 | Gurr et al. | 364/492 |
| 4,641,248 | 2/1987 | Suzuki et al. | 364/492 |
| 4,758,962 | 7/1988 | Fernandes | 364/483 |
| 4,843,575 | 6/1989 | Crane | 364/550 |

OTHER PUBLICATIONS

J. R. Ochoa Mendoza, "Composite Power Systems Reliability Evaluation," Dept. of Electrical Engineering and Electronics, Univ. of Manchester, Inst. of Sci. and Tech. (UMIST), pp. 1–347, Dec. 1986.

Endrenyi, J. et al., "Bulk Power System Reliability Assessment—Why and How? Part II: How?" IEEE Trans. Power Apparatus Syst., vol. PAS–101, No. 9, pp. 3446–3456, Sep. 1982.

Billinton, Roy et al., "Adequacy Evaluation of a Composite Power System—A Cmparative Study of Existing Computer Programs," Canadian Electrical Association Power System Planning and Operating Section, Spring Meeting Mar. 1985.

Salvaderi, Luigi, et al., "A Comparison Between Two Fundamentally Different Approaches to Composite System Reliability Evaluation," IEEE Trans. Power Apparatus Syst., vol. PAS–104, No. 12, pp. 3486–3492, Dec. 1985.

Billinton et al., "Effect of Station Originated Outages In A Composite System Adequacy Evaluation of the IEEE Reliability Test System," IEEE Trans. Power Apparatus Syst., vol. PAS–104, No. 10, pp. 2649–2656, Oct. 1985.

"Bulk Power System Reliability Concepts and Applications," IEEE Transactions on Power Systems, vol. 3, No. 1, Feb. 1988.

Agarwal, S.K., et al., "Effect of Station Originated Outages On Bulk Power System Reliability," CIGRE, Symposium Montreal 1991.

Medicheria, T.K.P., "Transmission Station Reliability Evaluation," IEEE 1993.

M.P. Bhavaraju et al., "Requirements For Composite System Reliability Evaluation Models," IEEE Transactions on Power Systems, vol. 3, No. 1, Feb. 1988.

*Primary Examiner*—Vincent N. Trans
*Attorney, Agent, or Firm*—Woodcock Washburn Kurtz Mackiewicz & Norris LLP

[57] ABSTRACT

A computer workstation-based interactive tool for assessing the reliability of power systems is disclosed. This tool can be used to determine the effect on the reliability of both substations and bulk generation and transmission systems of system additions, design alternatives, maintenance practices, substation configurations, and spare part policies. Each utility using the present invention is modeled analytically. The model includes load characteristics, demand projections, voltage profiles, energy and operating constraints, operator and automatic responses to the occurrence of contingent events, generating unit dispatch, contingency remedial actions, load shedding practices, demand-side management, and equipment failure modes including planned and unplanned maintenance.

16 Claims, 6 Drawing Sheets

SYSTEM FOR OPTIMIZING POWER NETWORK DESIGN RELIABILITY

This is a continuation of application Ser. No. 08/414,574, filed Mar. 31, 1995, now abandoned.

FIELD OF THE INVENTION

The present invention relates generally to the field of power distribution and transmission systems. More particularly, the present invention relates to a tool for deriving an optimized power system design from a set of input parameters.

BACKGROUND OF THE INVENTION

The basic functions of a power system are to continuously maintain an adequate supply of electric power and to economically and reliably provide electric power to customers. However, performing these functions is not always possible because various types of failures occur randomly and beyond the control of system engineers. Power system planners, designers, and operators are generally concerned with the reliability of their systems and the determination of realistic adequacy/availability targets for their systems. Recently, this concern has been accentuated by restrictions imposed on system additions and enhancements by public and regulatory bodies. Increased pressure from regulatory bodies to keep electric rates to a minimum has forced utility managers to look for more advanced analytical methods for determining the benefits and costs of system enhancements and the consequences of unavailability and interruption of electric power.

The techniques first used in practical applications of power system design were developed to account for randomly occurring failures. These techniques were all deterministic in nature. Their primary weakness was a lack of consideration for the stochastic nature of system behavior, customer demands, and component failures.

An overview of power system modeling will now be provided.

Power systems typically are complex, highly integrated, and large. A power system model may be divided into appropriate subsystems that can be analyzed separately. For example, such subsystems may include generating stations, a generating capacity subsystem, a transmission network, a distribution network, a bulk generation and transmission subsystem, and interconnected systems, substations, and protection systems.

Adequacy of Generating Facilities

Generating capacity reliability indices include the loss of load expectation (LOLE), loss of energy expectation (LOEE), and frequency and duration (F&D). These reliability indices can be calculated using direct analytical techniques or Monte Carlo methods.

The LOLE index is the most widely used and can be applied to single and interconnected systems. This index represents the average number of days on which the daily peak load is expected to exceed the available generating capacity. The LOLE index does not indicate the severity of the deficiency or the frequency or duration of the loss of load.

The LOEE index represents the expected energy that will not be supplied by the generating system due to deficiencies in generating capacity. This index provides an indication of the severity of the deficiency.

The F&D index is an extension of the LOLE index. It provides the expected frequency of deficiency occurrences and the duration of such deficiencies. The F&D index represents additional physical characteristics, which makes it sensitive to other parameters of the generating system and provide more information to system planners. The F&D method is more extensively used in network reliability studies than in generating capacity studies.

Adequacy of Distribution Networks

The primary reliability indices for distribution networks include the average failure rate, average outage duration, average annual reliability, and average annual outage time. These indices are indicative of the reliability levels of the power system but do not provide a complete representation of system behavior. Additional indices must be computed to assess the severity of a system outage. These additional indices may include customer, load, and energy indices, which are useful in predicting future reliability and in assessing the past performance of the system.

Bulk Power system Reliability

A bulk power system is a combination of generation facilities and a transmission network. A recent survey indicated that the need for evaluating bulk power system reliability lies in the following areas:

Consideration of transmission constraints,

Optimization of investment,

Resource sharing and strategic planning among utilities,

Improved representation of generation effects,

Availability of dispersed generation in future systems, and

Analysis of the effects of load management on area transmission needs.

See "Requirements for Composite System Reliability Evaluation Models," M. P. Bhavarhau, et al., *IEEE Trans. On Power Systems*, Vol. 3, No. 1, pp. 145–157, February 1988.

Bulk power system adequacy is basically measured in terms of the unreliability created by events in the bulk system. The term "unreliability" refers to the inability of the system to provide the required electricity to all customers. Basic adequacy indices have been defined and are of a general nature that can be expanded based on individual utility needs. Typically, these indices are measured in an annualized format at a fixed load level. Individual load point or bus indices can be aggregated to produce a set of area or system level indices that provides an overall assessment of the system adequacy.

The selection of design criteria for new or additional equipment can be based on an overall system optimization. For example, the selection of design criteria should consider reliability, cost, revenue, benefit to and effect on power supply if the additional facility is implemented, and system integrity with and without the additional facility. Utility managers and regulatory bodies typically prefer to see the outcome of this decision-making process presented in a cost/benefit framework. If the reliability assessment could be handled on this basis, the justification of projects would be greatly expedited. Unfortunately, the methods, analytical tools, and field data available today limit the cost/benefit evaluation. There is a need for an advanced analytical tool that can be used to complement the planning process used today so that a more complete analysis of system alternatives can be made.

SUMMARY OF THE INVENTION

Accordingly, a primary goal of the present invention is to provide an analytical tool that will enhance the power system planning and operation processes, both from the bulk system and substation perspectives. This tool should consider equipment and contingency remedial costs for a complete assessment of system alternatives. These alternatives may relate to maintenance policies, spare parts practices, and enhancement delays.

A further goal of the present invention is to provide practical embodiments of such a tool, wherein the embodiments allow the user to: (1) evaluate planning alternatives and make it easier for utilities to justify or delay projects within a more complete framework than the one used today; (2) model and assess different operational practices; and (3) optimize substation designs from a cost/benefit perspective.

One presently preferred embodiment of the invention (described below) provides an engineering tool for assessing the reliability of bulk power generation and transmission systems. A reliability assessment of a bulk power system is concerned with the determination of adequacy levels of the combined generation and transmission facilities in regard to providing a dependable and suitable supply at the consumer end of the system. Based upon this assessment, reliability targets may be established to guide the development of new and unconventional arrangements and modular design concepts for future generations of equipment and substations. If reliability targets are established, optimum layouts and design concepts can be developed with due consideration given to benefits and constraints of equipment technologies and costs. Potential improvements in reliability levels can be evaluated by incorporating optimal on-site spare equipment and/or maintenance practices.

The presently preferred embodiment of the invention combines probabilistic techniques with economics in the analysis of planning and operating alternatives. For the substation optimization function, the invention includes sophisticated linear programming techniques for the selection of the optimum layout. The invention makes use of accurate and computationally fast techniques permitting the use of this invention in different hardware platforms without sacrificing execution speed.

The contingency selection process involves a unique combination of minimum probability (or frequency) of occurrence with severity. This ensures that the contingencies that are fully processed are, at the same time, severe enough and likely to occur to warrant their analysis. The analysis of contingencies that do not qualify is not performed and, therefore, processing time is not wasted.

The preferred embodiment combines in its analysis both the macro level view of the power system (generation and transmission) and substations. With this combined analysis, the invention not only assesses the reliability of substations as isolated systems, but also assesses the impact of specific layouts on the bulk power system. Therefore, the analysis performed is complete.

The preferred embodiment allows the analysis of several periods into the future in a single execution. Issues such as uneven load growth (e.g., high load growth in an area, no growth in another area), annual load growth, equipment installed at a future date, equipment retired at a future date, substations energized at different dates can be included in the assessment performed by the invention.

Included in the preferred embodiment is the modeling of real operating conditions. This includes issues such as shedding load (load reduction) as done in a real environment; i.e., the load shed is the amount actually shed in reality and not the optimum amount of load. With this feature, utilities can assess the real impact of their operating practices.

The user interface employed in this embodiment is self contained (i.e., it does not require an interface to other systems), has a full graphics capability, and allows a friendly interface with the user.

Other features of the invention are disclosed below.

DETAILED DESCRIPTION OF PREFERRED EMBODIMENTS

The present invention is preferably embodied as a computer workstation-based interactive tool for assessing the reliability of bulk power systems. This tool can be used to determine the effect—on the reliability of both substations and bulk generation and transmission systems—of system additions, design alternatives, maintenance practices, substation configurations, and spare parts policies. According to one presently preferred embodiment of the invention, each utility using the present invention is modeled analytically. The model includes load characteristics, demand projections, voltage profiles, energy and operating constraints, operator and automatic responses to the occurrence of contingent events, generating unit dispatch, contingency remedial actions, load shedding practices, demand-side management, and equipment failure modes including planned and unplanned maintenance. Weather effects and availability of spare parts may also be included in the model.

Preferably, for a complete assessment, embodiments of the invention are based on reliability techniques that take into account the total cost of ownership. The invention determines the level and cost of reliability for bulk power systems and their substations based on equipment and system data. Embodiments of the invention are preferably built upon computationally efficient techniques that select, process, and analyze equipment outages.

Several practical applications of the invention include:
1. Identification of weak and over-designed areas;
2. Optimization of station layouts and locations;
3. Evaluation of maintenance and spare parts policies;
4. Assessment of the effect of new operating practices such as load shedding or Demand Side Management (DSM) (DSM is a methodology by which the electric utilities have full control (on/off) of load at distribution level; using DSM, utilities are able to manage load levels that can help them in periods of peak or low load conditions), or new environments such as open transmission access or NUGs (an NUG (Non-Utility Generator) is an electrical power generator that is not owned by an electric utility; typically, NUGs are owned by industries that use this generation to satisfy their own needs and sell any extra available capacity to the electric utilities);

5. Cost/benefit analysis for system enhancements; and
6. Analysis of the effect of load growth with and without new facilities.

In addition, embodiments of the invention preferably include the following features:

1. Graphical User Interface: a user friendly system to enter the power system model and station layouts (one-line diagrams), to enter equipment information, to control program execution, and to examine results.
2. Network Solution: state-of-the-art AC load-flow techniques for the static evaluation of power system equipment outages. Software efficiency (execution speed) is emphasized.
3. Contingency Selection: methods available include probability and frequency thresholds, contingency ranking, and outage level.
4. Power System Modeling: comprehensive and up-to-date equipment modeling is included in the load-flow solution algorithm. FACTS devices may be added as their models are developed. (FACTS (Flexible AC Transmission Systems) is a term used to classify the devices that can control power flow in transmission lines in a dynamic and fast fashion. Examples of these devices are the thyristor-controlled series capacitor and high-voltage DC systems.)
5. Equipment Failure Mode: Independent, dependent, common-mode, and station-originated outages are included in the analysis.
6. Weather and Maintenance Modeling: Weather effects, equipment maintenance policies, and economics are modeled.
7. Load Shedding: Real load shedding practices are modelled. Load shedding is an operating mechanism used by electric utilities to reduce the system load in order to mitigate the effects (e.g., insufficient generation to meet the demand, voltages below threshold values) of unexpected contingencies. (Load shedding is typically used as a last resource since it involves loss of customers and, therefore, loss of revenue.) Alternative load-shedding actions can be included to analyze future practices.
8. Remedial Actions: Real remedial actions are included to relieve system problems. The additional costs (for example, generation re-dispatch) of these remedial actions are determined. Re-dispatch is an operating mechanism used by electric utilities in an attempt to reduce overloaded conditions in transmission lines after a contingency has occurred in the system. This mechanism involves a different generating unit dispatch mode (this is why it is referred to as re-dispatch) from the one existing prior to the contingency. Dispatching a generating unit means to assign a pre-determined power output to that particular unit.
9. Multiple/Future Scenarios: The ability to analyze more than one period (e.g., one year) in a single execution with varying generation/load levels, and to analyze specific periods into the future.

Preferably, embodiments of the invention employ the following inputs:

1. Power System Model
   a. Load-Flow-Type Data;
   b. Bulk System and Station One-Line Diagrams.
2. Equipment Information
   a. Failure, Maintenance and Repair Data;
   b. Equipment and Maintenance Costs.
3. System-Type Data
   a. Customer Outage Cost;
   b. Relief Action and Load Shedding Policies.

The outputs provided by specific embodiments of the invention will depend on the particular application. Examples include:

1. Optimum station layout from a system perspective;
2. Cost/benefits of reinforcements;
3. Violations and reliability indices summaries.

Reliability indices summaries are a condensed set of outputs that identify the reliability level of either different parts of the system or the whole system. Examples of these summaries include:

Annualized Load Point Indices
  Basic values
    Probability of failure
    Frequency of failure
    Number of voltage violations
    Expected load curtailed
    Expected energy (demand)-not-supplied
    Duration of load curtailment
  Maximum values
    Maximum load curtailed
    Maximum energy curtailed
    Maximum duration of load curtailment
  Average values
    Average load curtailed
    Average energy-not-supplied
    Average duration of load curtailment
  Bus isolation values
    Expected number of curtailments
    Expected load curtailed
    Expected energy-not-supplied
    Expected duration of load curtailment
Annualized System Indices
  Basic values
    Bulk power interruption index
    Bulk power supply average MW curtailment/disturbance
    Bulk power energy curtailment index
  Average values
    Number of curtailments/load point
    Load curtailed/load point
    Duration of load curtailed/load point
    Number of voltage violations/load point
  Maximum values
    Maximum system load curtailed
    Maximum system energy-not-supplied
Customer-Oriented Indices
  Probability of load loss
  Frequency of load loss
  Frequency of customer outages—SAIFI & CAIFI
  Duration of customer outages—SAIDI & CAIDI
  Service availability Preferred embodiments of the inventive software tool are based on a state enumeration technique that can be used for a complete reliability assessment of bulk (generation and transmission) power systems and their substations. Preferably, the tool will be able to automatically analyze multi-periods and variable load levels at each bus, in every system area or in the whole system. (Note that all electric utility systems are divided into areas for modeling and reporting issues. There is no standard for what should constitute an area. Areas can be arranged in a geographical sense or in an operating context.) The tool preferably is also capable of modeling substation- and system-level equipment for a complete and automatic assessment. In addition, a powerful man-machine user interface based on a GUI (graphical user interface) language will allow users to easily communicate with the application software and create study scenarios.

Figure 1:
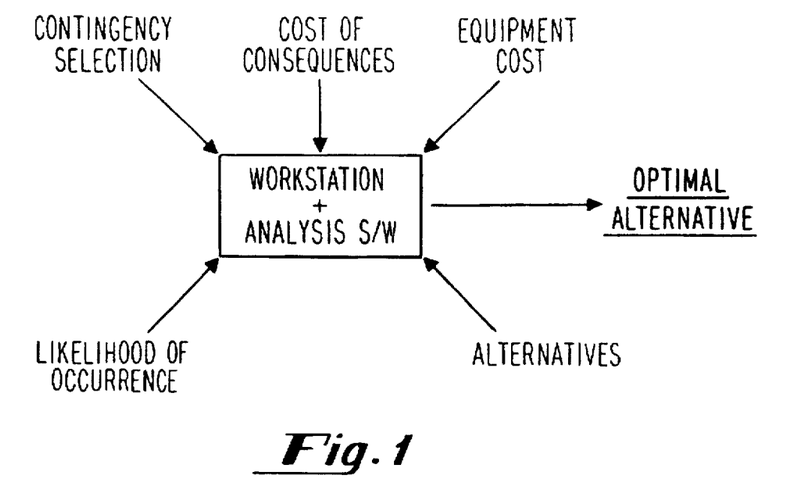
FIG. 1 provides an overview of the present invention by depicting a programmed computer workstation and inputs and output of the programmed analysis.

FIG. 1 is a schematic overview of the present invention. The invention employs a programmed computer workstation and a probablistic-based methodology, as opposed to the deterministic-based methodologies currently employed by electric utilities. Deterministic-based methodologies consider only the effect of different pre-selected contingencies on the system without considering the likelihood of occurrences of those contingencies. As indicated in FIG. 1, the present invention determines an optimal alternative by analyzing contingencies, likelihoods of occurrences, costs of consequences, equipment costs, and alternatives.

Figure 2:
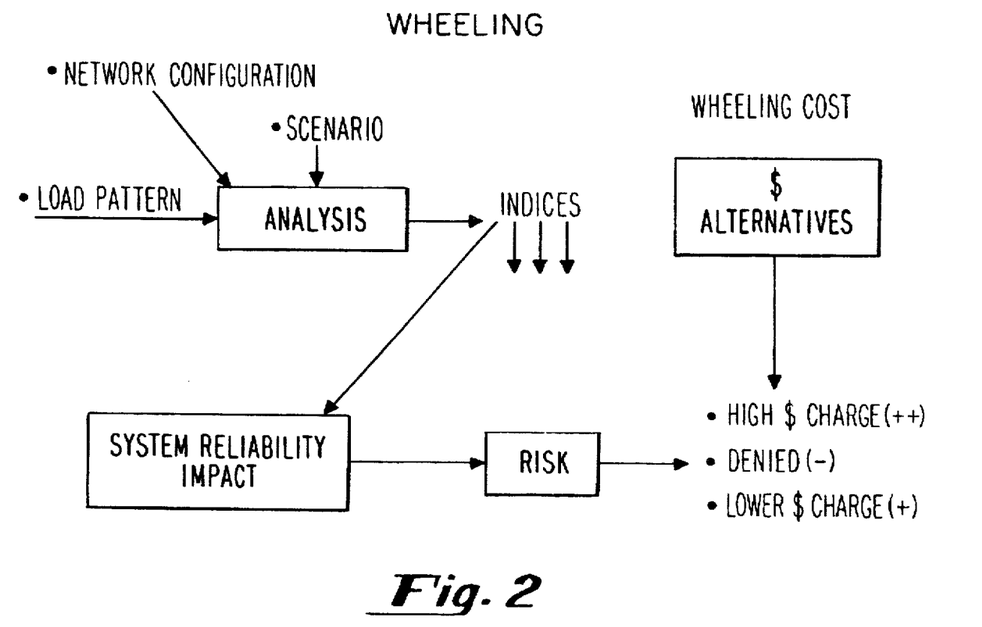
FIG. 2 schematically depicts how the present invention can be employed to determine whether wheeling should be denied or allowed given its impact on system reliability.

For example, one practical application of the present invention is to determine the effect of wheeling on system reliability. ("Wheeling" is used in the electric utility industry to refer to transmission of power. Wheeling can exist between two neighboring utilities or between two non-contiguous utilities, in which case the power is "wheeled" through a third utility system.) This application is schematically represented by FIG. 2. As shown, the invention is employed to determine whether wheeling is denied or allowed given its effect on system reliability. If wheeling is allowed, the invention can then be used to determine the charges for wheeling given the risk to system reliability at the time wheeling is demanded. As shown in FIG. 2, a load pattern, a network configuration, and a scenario are input to an analysis routine, which outputs a plurality of indices. ("Scenario" is the term used to define the characteristics of the study to be conducted. These characteristics include, among other things: load levels, system conditions, areas of interest and a set of reliability indices to calculate.) Another module determines the effect on system reliability on the basis of these indices. The risk to system reliability is determined and then the invention determines whether wheeling should be allowed and the required charges.

Figure 3:
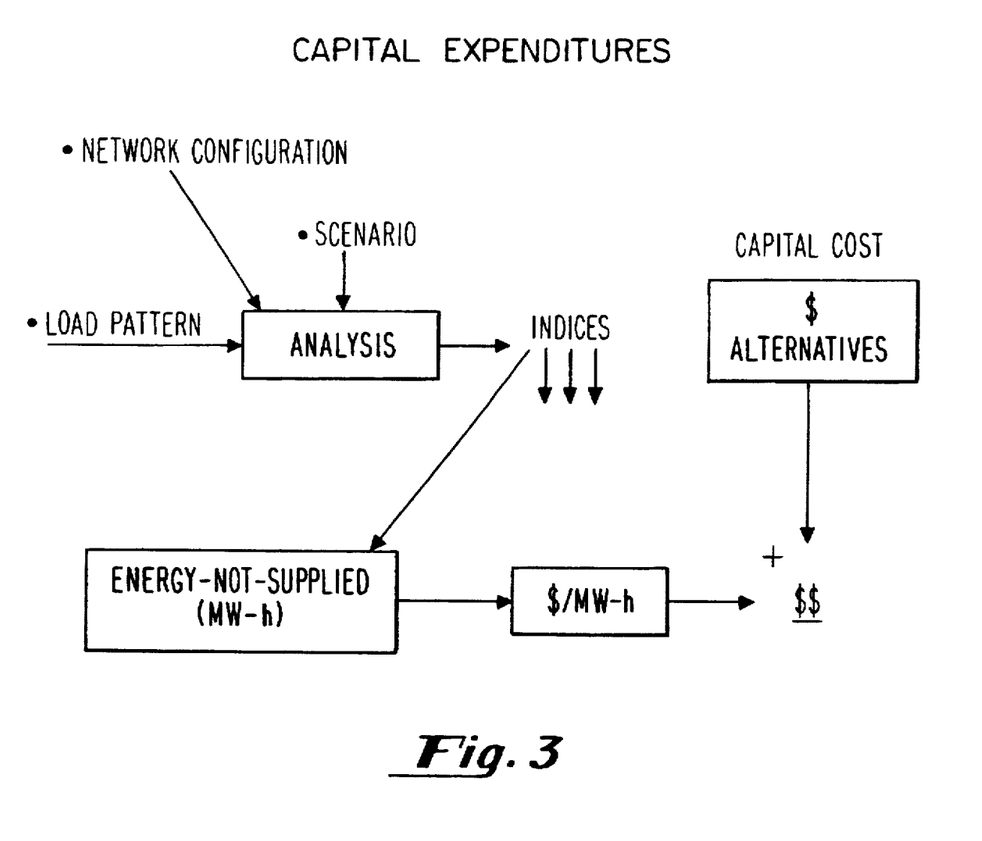
FIG. 3 schematically depicts how the present invention can be employed to evaluate the benefits of a capital expenditure based upon its effect on system reliability.

FIG. 3 depicts another practical application of the present invention. This figure depicts a cost/benefit analysis with regard to capital expenditures. As shown, the invention can be employed to evaluate the benefits of capital expenditures based upon the effect on reliability and on effect indices such as an "energy-not-supplied" index, which can be translated into a dollar amount. (The energy-not-supplied index, expressed in megawatt-hours (MW-h), represents the amount of energy that the utility was not able to serve due to the implementation of the load shedding mechanism. This index can be turned into dollars by factoring the cost in dollars of each MW-h. Therefore, the modified index represents loss of revenue.) With this application, different alternatives can be compared to each other and the best alternative can then be selected.

Figure 4:
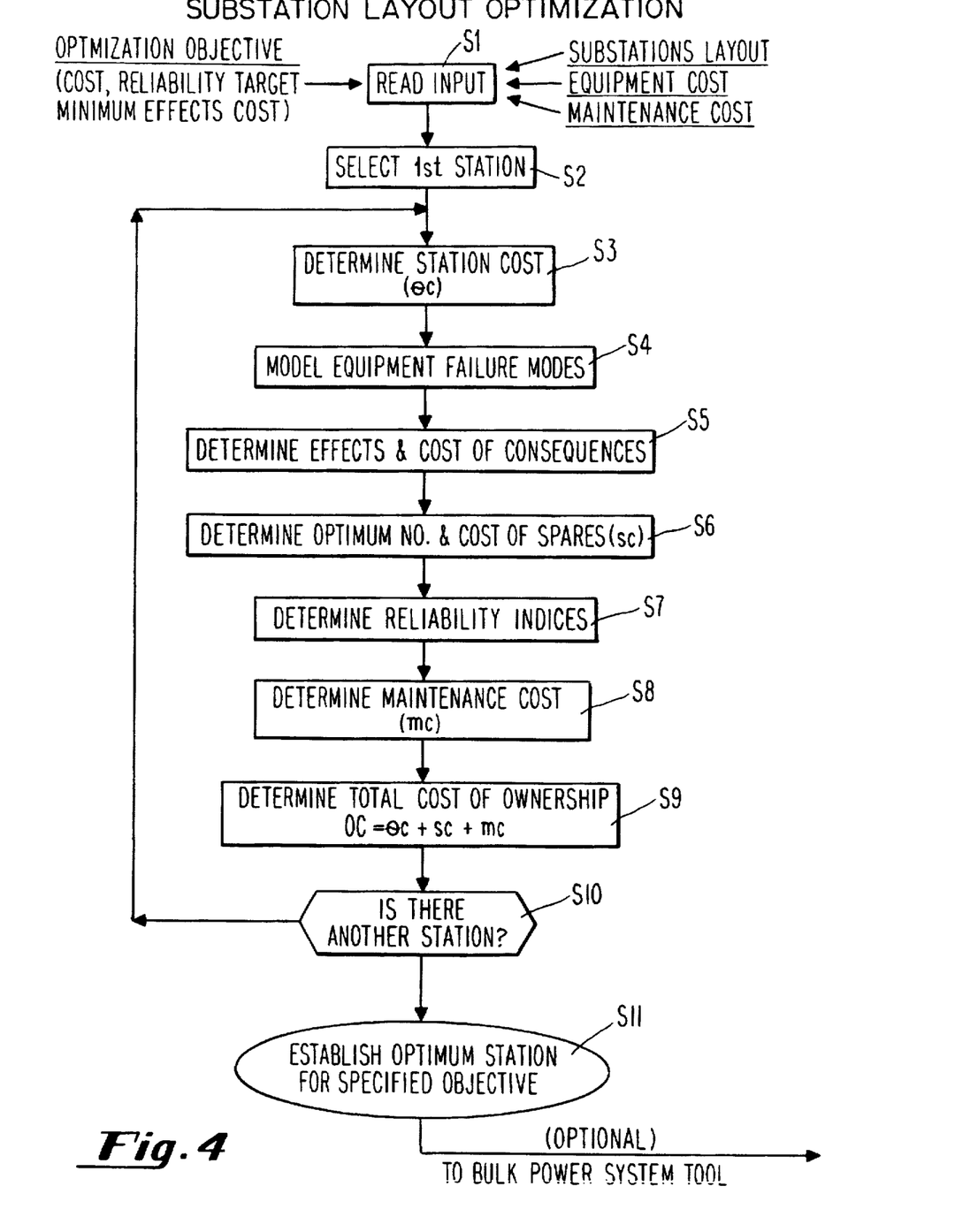
FIG. 4 is a flow chart of a substation layout optimization procedure in accordance with the present invention.

FIG. 4 is a flow chart of a substation layout optimization procedure in accordance with the present invention. An overview of the substation optimization procedure is provided next, and then a detailed explanation is given.

Electric utilities have traditionally used standard layouts for their substations. The standard layouts are based on voltage class and importance of the substation without considering the cost associated with it or any other factors. Therefore, the selection of substation layout is typically far from optimum. The substation analysis methodology described herein allows the selection of the optimum layout by considering all factors that should be considered in the evaluation of substation layouts. These factors include the capital investment, the maintenance cost of the substation equipment, the effect of the layout on the bulk power system, and the optimization objective. Among the optimization objectives are to minimize cost (i.e., the lowest priced layout), to meet a certain reliability target (e.g., 98% availability), and the minimization of the effects cost (i.e., minimization of the outage statistics for the elements connected to the substation such as transmission lines, transformers, and load points). Furthermore, the disclosed methodology allows the assessment of substation layouts that do not exist so that a thorough assessment of different alternatives can be made.

The procedure begins at step S1 (FIG. 4) with the input of an optimization objective, the layout of one or more substations, and the cost for equipment and maintenance. As indicated in the flow chart, the optimization objective may be in terms of cost, a reliability target, or minimum effects cost.

Figure 5:
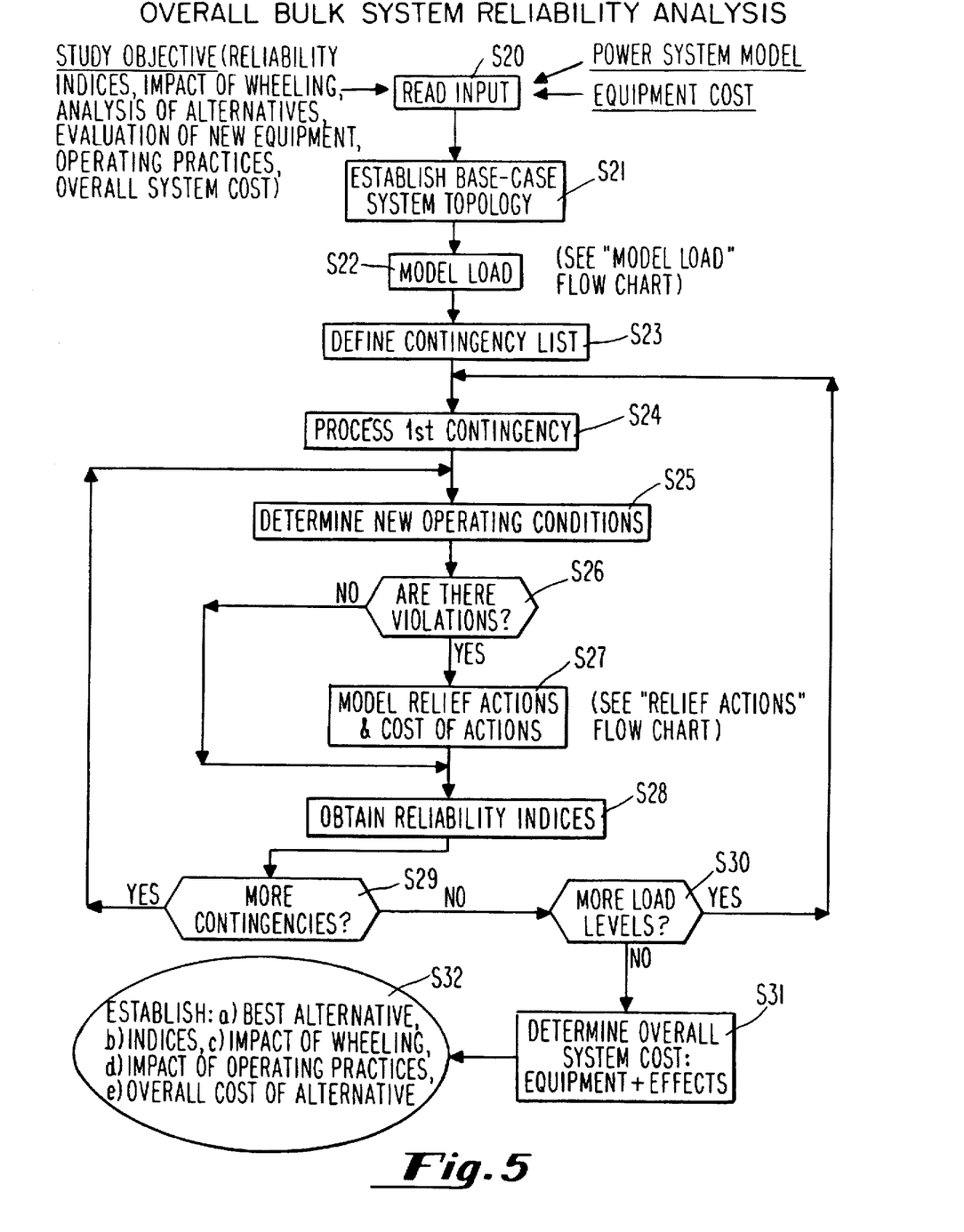
FIG. 5 is a flow chart of an overall bulk system reliability analysis procedure in accordance with the present invention.

At step S2, a first substation is selected. At step S3, the substation cost ($\theta$c) is determined. At step S4, equipment failure modes are modeled. At step S5, the effects and cost of equipment failures are determined. At step S6, an optimum number and cost of spare equipment (sc) are determined. At step S7, reliability indices are determined. At step S8, maintenance costs (mc) are determined. At step S9, the total cost of ownership (OC) of the substation is determined. At step S10, the procedure branches back to step S3 if there is another substation. Otherwise, the procedure proceeds to step S11, where an optimum station layout for the specified objective is established. At this juncture, the procedure may continue to the overall bulk system reliability analysis, which is depicted in FIG. 5.

The objective of step S11 is to determine the best (or optimum) substation configuration of a series of alternatives. The best will be the one that yields the highest reliability at the minimum cost. Since these two variables, cost and reliability, are interrelated, the solution to the problem can only be obtained with an optimization technique.

The technique to be used is based on the concept of designing a single objective function comprised of the sum of the deviations of each criteria (i.e., reliability and cost) from its individual optimum value as a ratio to that optimum value. The objective then becomes to minimize that function. Therefore, the substation optimization problem has the following form:

The function to minimize is function "F", which is equal to:

$$F = \Sigma [(f_i(x^*) - f_i(x))/f_i(x^*)]^p$$

subject to: $g_j(x) \leq 0$, $j=1, 2, \ldots, m$  $x \geq 0$ where:

$f_i(x^*)$ = value of objective function "I" at its individual optimum value $f_i(x)$ = the objective function "I" itself  p = an integer valued exponent. The larger the value of "p", the more weight larger deviations have.

$g_j$ = the function of constraint "j"

This model will be used to select the best alternative in the base-case substation configuration as follows:

$F_i$=the value of function "F" for configuration "i"
$R_i$=the calculation reliability for configuration "i"
$C_i$=the calculated cost for configuration "i"
Let f(r)=the reliability function and f(c)=the cost function. So, $f(r^*)$=1=the optimum |highest| reliability (measured between 0 and 1) of the substation Let $f(c^*)=C_g$=user's planning budget for the substation Then, $$F_i = [(1-R_i)/1]^p + [(C_i - C_g)/C_g]^p$$

if $(C_i - C_g) \leq 0$ (i.e., $C_i \leq C_g$), the second term of function "F" is zero.

The best substation configuration will be the minimum value of "$F_i$", for i=1, 2, ..., n (where "n" is the different substation configurations being evaluated).

Referring to FIG. 5, the overall bulk system reliability analysis begins at step S20, where a study objective, power system model, and equipment cost are input. The study objective may include a determination of reliability indices, a determination of the effect of wheeling, an analysis of alternatives, an evaluation of new equipment, an evaluation of operating practices, and/or an overall system cost determination. The methodology described herein provides a complete framework, a probabilistic/economic approach, that supports both the planning and operating procedures of electric utilities in the evaluation of alternatives. This methodology evaluates operating issues such as (1) the risk for wheeling additional power at the time of peak loading conditions, (2) the selection of the least severe load shedding (reduction of load) mechanism that would minimize loss of revenues or minimize number of unserved customers, and (3) the optimum generation re-dispatch that minimizes cost. This methodology supports planning issues such as (1) the selection of the best location for the placement of a new substation from the economic and reliability point of view, (2) the selection of the best solution for an increase of power transmission capability from an economic and reliability points of view, (3) the assessment of the impact on the system reliability if nothing is added to the system in spite of an expected growth in load, and (4) the optimum spare-parts policy to meet a reliability/maintainability target.

At step S21, a base-case system topology is established. At step S22, a system load is modeled. At step S23, a contingency list is defined. At step S24, the first contingency is processed. At step S25, new operating conditions are determined. At step S26, the procedure determines whether there are any violations. ("Violations" is the term used to group system problems such as transmission line overloads, transformer overloads, voltages below or above specified limits, busbar isolations, system islanding (the split of the system into two or more smaller systems), and reactive power requirements above the available levels.) If so, the procedure continues to step S27, where relief actions and the cost of relief actions are modeled. If there are no violations or after step 27, the procedure continues to step S28, where reliability indices are obtained. At step S29, the procedure determines whether there are more contingencies to be processed. If so, the procedure branches back to step S25. If not, the procedure continues to step S30, where it determines whether there are more load levels. If there are more load levels, the procedure branches back to step S24. If there are no more load levels, the procedure continues to step S31, where the overall system cost is determined for both equipment and contingency effects. Lastly, at step S32, the procedure establishes one or more of the following: (a) best alternative, (b) indices, (c) effect of wheeling, (d) effect of operating practices, (e) overall cost of alternative. All possible alternatives that are candidates in meeting a specific need may be evaluated. For example, to increase power wheeling through a specific corridor, there are several alternatives: (1) increase the voltage of the transmission line, (2) change the AC line to a DC line, (3) compensate the transmission line with series capacitors. Each of the alternatives provide similar results but they involve different levels of investment to materialize in terms of capital and maintenance costs. The inventive methodology analyzes these costs, determines the impact/benefit of each of the alternatives, and provides the required information so that the user can decide which alternative (solution) is the best for that specific application.

The overall cost ($OC_i$) of an alternative may be assessed as follows:

$$OC_i = cc_i + CENS_i + CGD_i + COC_i$$

where:

$OC_i$=overall cost of alternative "i"

$OC_i$=total capital cost involved in alternative "i"

$$CC_i = \Sigma(cc_j) \text{ for } j=1, 2, \ldots, n$$

where:

j=all equipment involved in alternative "i"

$CENS_i$=total cost of energy-not-supplied caused by the contingencies processed when alternative "i" was considered $$CENS_i = \Sigma(ens_j) \text{ for } j=1, 2, \ldots, n$$

where j=all contingencies processed during the assessment of alternative "i"

$CGD_i$=total cost of generation re-dispatch caused by the contingencies processed when alternative "i" was considered $$CGD_i = \Sigma(cgd_j) \text{ for } j=1, 2, \ldots, n$$

where:

j=all contingencies processed during the assessment of alternative "i"

$COC_i$=total customer costs caused by interruptions of service due to the contingencies processed when alternative "i" was considered $$COC_i = \Sigma(coc_j) \text{ for } j=1, 2, \ldots, n$$

where:

j=all contingencies processed during the assessment of alternative "i"

The selection of the best alternative may be based on the lowest "overall" cost of alternative (OC) as calculated above. Selecting the alternative based on the minimum "OC" guarantees that this alternative yields the highest benefits in terms of the impact to the ultimate customers, and to the reliable operation of the system. Therefore, the selection of the best alternative will be done using the following criterion:

*Best alternative=min $\{OC_i\}$ for i =1, 2, 3=... (all alternatives)*

The reliability levels of the systems analyzed may be assessed by different indices that relate to the systems' operation performance. The basic set of indices are as follows:

Probability (P) and frequency (F) of the following conditions:

overloaded lines and transformers $$P=\Sigma(p_k) \text{ for } k=1, 2, 3, \ldots$$

$$F=\Sigma(p_k/d_k) \text{ for } k=1, 2, 3, \ldots$$

where:
$p_k$=probability of contingency "k"
$d_k$=duration of contingency "k"
k=contingencies that cause an overload voltage violations $$P=\Sigma(p_m) \text{ for } m=1, 2, 3, \ldots$$

$$F=\Sigma(p_m/d_m) \text{ for } m=1, 2, 3, \ldots$$

where:
$p_m$=probability of contingency "m"
$d_m$=duration of contingency "m"
m=contingencies that cause a voltage violation reactive power violations $$P=\Sigma(p_r) \text{ for } r=1, 2, 3, \ldots$$

$$F=\Sigma(p_r/d_r) \text{ for } r=1, 2, 3, \ldots$$

where:
$p_r$=probability for contingency "r"
$d_r$=duration of contingency "r"
r=contingencies that cause a reactive power violations busbar isolations $$P=\Sigma(p_n) \text{ for } n=1, 2, 3, \ldots$$

$$F=\Sigma(p_n/d_n) \text{ for } n=1, 2, 3, \ldots$$

where:
$p_n$=probability of contingency "n"
$d_n$=duration of contingency "n"
n=contingencies that cause
busbar(s) isolation system islanding $$P=\Sigma(p_t) \text{ for } t=1, 2, 3, \ldots$$

$$F=\Sigma(p_t/d_t) \text{ for } t=1, 2, 3, \ldots$$

where:
$p_t$=probability of contingency "t"
$d_t$=duration of contingency "t"
t=contingencies that cause system islanding load shedding $$P=\Sigma(p_s) \text{ for } s=1, 2, 3, \ldots$$

$$F=\Sigma(p_s/d_s) \text{ for } s=1, 2, 3, \ldots$$

where:
$p_s$=probability of contingency "s"
$d_s$=duration of contingency "s"
s=contingencies that cause load shedding Energy not supplied (ENS) and loss of revenue (LR) due to the following conditions:

load shedding due to busbar isolations $$ENS=\Sigma(ls_k*d_k) \text{ for } k=1, 2, 3, \ldots$$

$$LR=\Sigma(ens_k*\$/MWh) \text{ for } k=1, 2, 3, \ldots$$

where:
$ls_k$=load shedding (MW) in contingency "k"
$d_k$=duration of contingency "k"
$/MWh=price (dollars) of each MWh
k=contingencies that resulted in load shedding due to busbar isolations load shedding due to voltage violations $$ENS=\Sigma(ls_m*d_m) \text{ for } m=1, 2, 3, \ldots$$

$$LR=\Sigma(ens_m*\$/MWh) \text{ for } m=1, 2, 3, \ldots$$

where:
$ls_m$=load shedding (MW) in contingency "m"
$d_m$=duration of contingency "m"
$/MWh=price (dollars) of each MWh
m=contingencies that resulted in load shedding due to voltage violations loading shedding due to overloaded lines and transformers $$ENS=\Sigma(ls_n*d_n) \text{ for } n=1, 2, 3, \ldots$$

$$LR=\Sigma(ens_n*\$/MWh) \text{ for } n=1, 2, 3, \ldots$$

where:
$ls_n$=load shedding (NW) in contingency "n"
$d_n$=duration of contingency "n"
$/MWh=price (dollars) of each MWh
n=contingencies that resulted in load shedding due to overloaded lines/transformers load shedding due to system islanding $$ENS=\Sigma(ls_t*d_t) \text{ for } t=1, 2, 3, \ldots$$

$$LR=\Sigma(ens_t*\$/MWh) \text{ for } t=1, 2, 3, \ldots$$

where:
$ls_t$=load shedding (MW) in contingency "t"
$d_t$=duration of contingency "t"
$/MWh=price (dollars) of each MWh
t=contingencies that resulted in load shedding due to system islanding Customer outage costs (COC) due to the following conditions:

load shedding due to voltage violations $$COC=\Sigma(ls_r*d_r*\$/MWhc) \text{ for } r=1, 2, 3, \ldots$$

where:
$ls_r$=load shedding (MW) in contingency "r"
$d_r$=duration of contingency "r"
$/MWhc=cost (dollars) to the customer for each MWh not served
r=contingencies that resulted in load shedding due to voltage violations load shedding due to overloaded lines and transformers $$COC=\Sigma(ls_v*d_v*\$/MWhc) \text{ for } v=1, 2, 3, \ldots$$

$$LR=\Sigma(ens_v*\$/MWh) \text{ for } v=1, 2, 3, \ldots$$

where:
$ls_v$=load shedding (MW) in contingency "v"

$d_v$ = duration of contingency "v"

$/MWhc = cost (dollars) to the customer for each MWh not served v = contingencies that resulted in load shedding due to overloaded lines/transformers busbar isolations $ENS = \Sigma(ls_n * d_n)$ for $n = 1, 2, 3, \ldots$ $LR = \Sigma(ens_n * \$/MWh)$ for $n = 1, 2, 3, \ldots$ where:

$ls_n$ = load shedding (MW) in contingency "n"

$d_n$ = duration of contingency "n"

$/MWhc = cost (dollars) to the costumer for each MWh not served n = contingencies that resulted in load shedding due to busbar isolations The effect of power wheeling through a system may be analyzed by comparing the reliability indices (described above) obtained at the different wheeling levels. The indices will change with the different power levels. Therefore, decisions can be made if the effect of the system reliability is known.

The effect of different operating practices may also be made by analyzing the change on the system reliability indices when different operating practices are made. If the impact (i.e., the change on the system reliability) of an operating practice is known, decisions can be made on whether or not the operating practice can be adopted.

Figure 6:
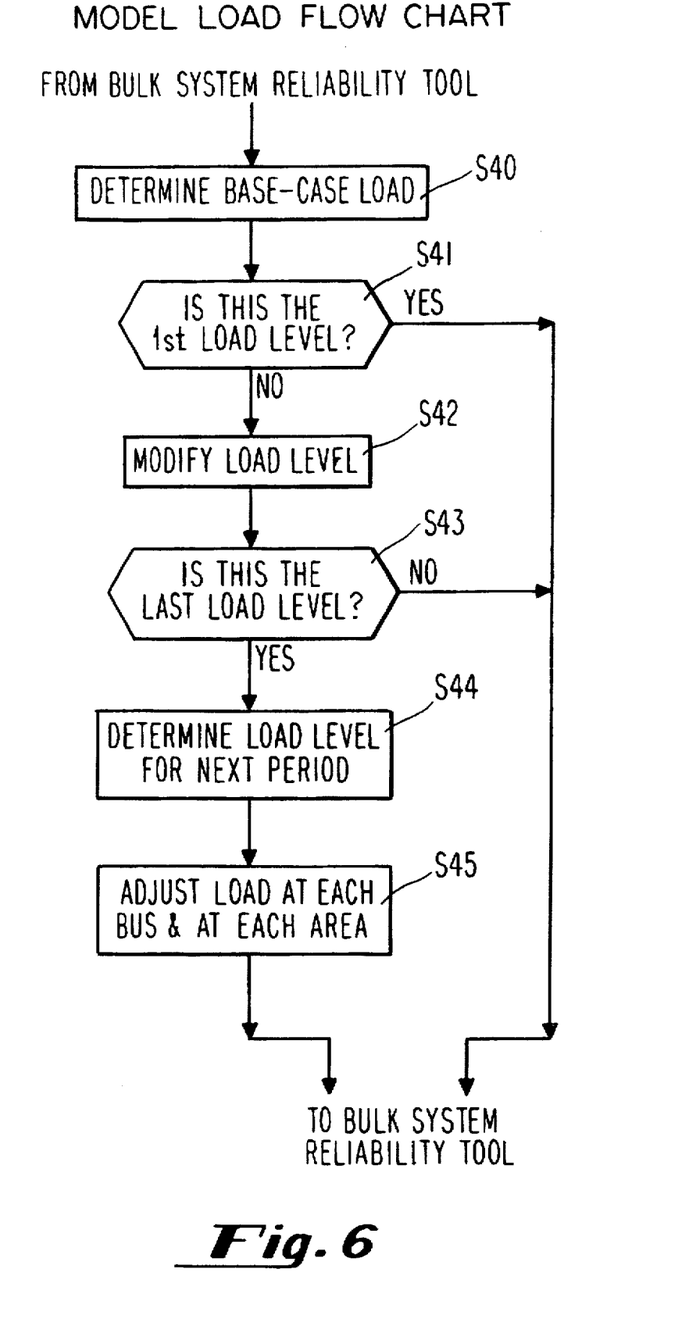
FIG. 6 is a flow chart of a procedure for modeling power system load in accordance with the present invention.

FIG. 6 is a flow chart of a procedure for modeling the system load. The model load flow chart of FIG. 6 represents the substeps performed in step S22 of FIG. 5. This procedure begins at step S40, where a base-case load is determined. At step S41, the procedure determines whether this is the first load level. If so, it returns to the bulk system reliability analysis (step S22 of FIG. 5). At step S42, the load level is modified. At step S43, the procedure determines whether this is the last load level. If not, the procedure returns to step S22 of the bulk system reliability analysis (FIG. 5). If this is the last load level, the procedure continues to step S44, where the load level for a next period is determined. Lastly, at step S45, the load at each bus and at each area is adjusted. The process then continues with the next step (step S23) of the overall bulk system reliability analysis (FIG. 5).

The selection of contingencies is a key process since it is impractical to analyze all possible contingencies in a practical power system. The process described above selects contingencies on a combination of minimum probability (or frequency) of occurrence based on equipment statistics and a contingency severity ranking mechanism. The contingencies that are fully processed have to meet the combined criterion. Step S24 involves the modeling of the first contingency (that passes the qualifying criterion) which changes the state of the power system. The next step (S25) involves the determination of the new operating conditions after the contingency is imposed. This determination is based on a complete modeling of the operating characteristics of the power system equipment (e.g., tap-changer-under-load transformers, capacitor banks). Part of this evaluation is the assessment of any system limit violations (step S26) which include voltages above or below specified limits, overloaded transmission lines or transformers, reactive power requirements higher than availability levels, system islanding (splitting of the system into two or more subsystems), or busbar isolations (parts of the system without generation). If violations are detected, relief actions are attempted to relieve these system conditions (step S27).

Figure 7:
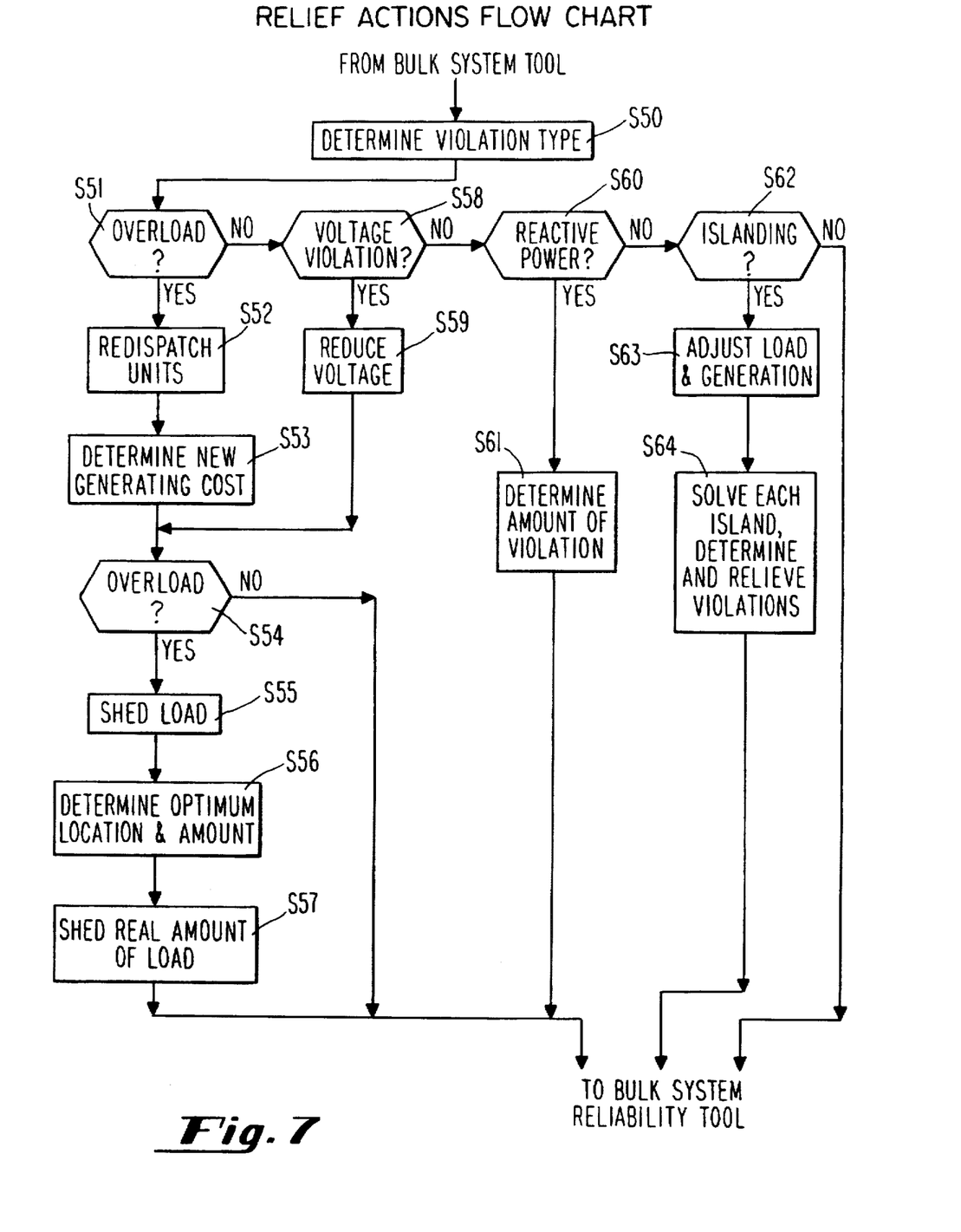
FIG. 7 is a flow chart of a procedure for determining relief actions in accordance with the present invention.

FIG. 7 is a flow chart depicting the substeps performed within step S27 of the overall bulk system reliability analysis (FIG. 5). In particular, FIG. 7 depicts the modeling of "relief action." This process begins at step S50, where a particular violation type is determined. At step S51, the process determines whether this is an overload violation. If so, the procedure continues to a "redispatch units" step S52 and then determines the new generating cost at step S53. If this is not an overload-type violation, at step S51 the process continues to step S58, where it determines whether this is a voltage violation. If so, the process continues to step S59, where the voltage is reduced. If this is not a voltage violation, the process continues to step S60, where it determines whether this is a reactive power violation. If so, at step S61 the process determines the amount of violation. If this is not a reactive power violation, the process determines whether this is an islanding violation. ("Islanding" is the term used when the power system is split into two or more subsystems or islands, each one with its own load and its own generation. This condition may occur when transmission lines are lost (on outage) due to a contingency. Typically, all power systems are integrated into a single island prior to any major transmission line outage.) This latter determination is made at step S62. If it is an islanding violation, the process adjusts the load and generation at step S63 and then at step S64 solves each island and determines and relieves the violation. When the system is split into two or more islands as a result of a contingency, the software determines the new operating conditions. If these new conditions involve some limit violations (e.g., overloads, voltage violations), the software attempts the relief of these violations. For example, in case overloaded lines are detected, the software will re-dispatch generation as a first step and will shed load as the last resource. In case voltage violations are found (even after all possible adjustments were attempted), load will be shed. The process returns to the overall bulk system reliability analysis (step S27) after completing steps S61, S64 and step S62, respectively. (Notes regarding steps S52 and S53: Re-dispatch units is the change in the amount of power required from the unit to generate (i.e., the change from the previously dispatched value). This change in generation output is used as an attempt to relieve overloading conditions in transmission lines and transformers. Since the re-dispatch function typically involves higher generating costs because it is not done on an economic basis as the original dispatch is usually done, the re-dispatch function will be optional. Some utilities might decide not to use it but rather shed (reduce) load. Once there is a change in the generation dispatch function (i.e., after re-dispatching), the total generation costs are different (usually higher) from the base case dispatching costs. Therefore, step S53 will calculate the new cost of generation and will compare it to the base case to assess the additional cost involved in trying to mitigate an overload condition. With this information available, utilities can decide whether to attempt to relieve overload conditions or to shed load.)

After steps S53 and S59, respectively, the process continues to step S54, where it determines whether there is an overload violation. If not, the process returns to the overall bulk system reliability analysis. If there is an overload violation, the process continues to step S55, where a "shed load" step is performed. Load will be shed to relieve an overload condition of a transmission line or a transformer if generation re-dispatch failed to relieve this condition. Then, at step S56, the process determines the optimum location and amount of load shedding. Finally, at step S57, the real amount of load is shed. The process then returns to step S27 of the overall bulk system reliability analysis (FIG. 5).

It will be appreciated that while particular embodiments of the invention have been shown and described, many modifications and variations of the present invention are possible in the light of the above teachings. It is to be understood that the scope of protection of the appended claims is not limited to the particular embodiments described hereinabove. For example, several steps of the presently preferred embodiment may be modified as described below:

Step S27: A possible modification is in step S27 in which relief actions are modeled since these actions might vary from utility to utility. For example, in the case of attempting to relieve an overloaded condition, the two most common actions now being modeled and implemented are re-dispatch and load shedding. It is possible that some electric utilities might have/adopt different methodologies to relieve an overload (e.g., load switching) or to relieve voltage violations (e.g., do nothing).

New Step 24-25 (Between the current steps S24 and S25): The embodiment described above processes and analyzes a single contingency. After this contingency is analyzed, the base case (i.e., the state of the system prior to the contingency) is re-created. A possible change is that instead of re-creating the base case, a second contingency (or third or fourth) is imposed on top of the first (or second or third) contingency. This would allow modeling of the effect of long duration contingencies.

Step S56: The present design involves the determination of the optimum load to shed and its location. A possible modification is to model load shedding at the load point closest to the overloaded element and not at the optimum location. The determination of whether or not to implement this function would depend on the different operating practices of the electric utilities.

Thus, the present invention may be employed in other specific forms without departing from the spirit or essential attributes thereof. Accordingly, reference should be made to the appended claims rather than to the foregoing specification as indicating the true scope of the invention.

We claim:

1. A computer-based interactive method for planning and operation of power systems, comprising the steps of:
    (a) developing an analytical model of the power system; and
    (b) determining the effect on reliability of the following: system additions, design alternatives, maintenance practices, substation configurations, and spare parts policies;
    wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

2. A computer-based interactive method for assessing the reliability of power systems, comprising the steps of:
    (a) developing an analytical model of the power system; and
    (b) determining the effect on reliability of at least one of the following: system additions, design alternatives, maintenance practices, substation configurations, and spare parts policies;
    wherein the model includes load characteristics, demand projections, voltage profiles, energy and operating constraints, operator and automatic responses to the occurrence of contingent events, generating unit dispatch, contingency remedial actions, load shedding practices, demand-side management, and equipment failure modes;
    wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

3. A computer-based interactive method for assessing the reliability of power systems, comprising the steps of:
    (a) developing an analytical model of the power system; and
    (b) determining the effect on reliability of at least one of the following: system additions, design alternatives, maintenance practices, substation configurations, and spare parts policies; and
    further comprising a substation layout optimization step comprising the following substeps:
        inputting an optimization objective, the layout of a substation, and the cost for equipment and maintenance associated with the substation layout;
        determining the cost ($\theta c$) of the substation;
        modeling failure modes of equipment associated with said substation layout;
        determining the effects and cost of equipment failures;
        determining an optimum number and cost of spare equipment (sc);
        determining reliability indices;
        determining maintenance costs (mc);
        determining the total cost of ownership (OC) of the substation; and
        establishing an optimum station layout for the specified objective;
    wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

4. A computer-based interactive method for assessing the reliability of power systems, comprising the steps of:
    (a) developing an analytical model of the power system; and (b) determining the effect on reliability of at least one of the following: system additions, design alternatives, maintenance practices, substation configurations, and spare parts policies; and further comprising an overall bulk system reliability analysis step comprising the following substeps:

determining a study objective, power system model, and equipment cost;
establishing a base-case system topology;
modeling a system load;
defining a contingency list;
processing a first contingency on said list;
determining new operating conditions;
determining whether there are any violations and, if so, modeling relief actions and the cost of relief actions;
determining reliability indices;
determining the overall system cost for both equipment and contingency effects; and
establishing one or more of the following: best alternative, indices, effect of wheeling, effect of operating practices, overall cost of alternatives;

wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

5. A method as recited in claim 4, wherein said violations include transmission line overloads, transformer overloads, voltages below or above specified limits, busbar isolations, system islanding, and reactive power requirements above the available levels.

6. A method as recited in claim 4, wherein said study objective includes a member of the following group: a determination of reliability indices, a determination of the effect of wheeling, an analysis of alternatives, an evaluation of new equipment, an evaluation of operating practices, and an overall system cost determination.

7. A method as recited in claim 4, wherein said step of modeling relief actions and the cost of relief actions comprises determining a particular violation type and then performing at least one of the following substeps:

if the violation type is an overload violation: re-dispatching generation, determining a new generating cost, determining whether there is still an overload violation and, if so, determining the optimum location and amount of load shedding and shedding the real amount of load;

if the violation type is a voltage violation: reducing the voltage, determining whether there is still an overload violation and, if so, determining the optimum location and amount of load shedding and shedding the real amount of load;

if the violation type is a reactive power violation, determining the amount of violation; and if the violation type is an islanding violation, adjusting the load and generation and then solving each island and relieving the violation;

wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

8. A computer-based interactive system for assessing the reliability of power systems, comprising:

(a) means for developing an analytical model of the power system; and (b) means for determining the effect on reliability of the following: system additions, design alternatives, maintenance practices, substation configurations, and spare parts policies;

wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

9. A computer-based interactive system for assessing the reliability of power systems, comprising:

(a) means for developing an analytical model of the power system; and (b) means for determining the effect on reliability of at least one of the following: system additions, design alternatives, maintenance practices, substation configurations, and spare part policies;

wherein the model includes load characteristics, demand projections, voltage profiles, energy and operating constraints, operator and automatic responses to the occurrence of contingent events, generating unit dispatch, contingency remedial actions, load shedding practices, demand-side management, and equipment failure modes;

wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

10. A computer-based interactive system for assessing the reliability of power systems, comprising:
   (a) means for developing an analytical model of the power system; and
   (b) means for determining the effect on reliability of at least one of the following: system additions, design alternatives, maintenance practices, substation configurations, and spare part policies; and
   further comprising a substation layout optimization means for performing the following substeps:
      inputting an optimization objective, the layout of a substation, and the cost for equipment and maintenance associated with the substation layout;
      determining the cost (θc) of the substation;
      modeling failure modes of equipment associated with said substation layout;
      determining the effects and cost of equipment failures;
      determining an optimum number and cost of spare equipment (sc);
      determining reliability indices;
      determining maintenance costs (mc);
      determining the total cost of ownership (OC) of the substation; and
      establishing an optimum station layout for the specified objectives;
   wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

11. A computer-based interactive system for assessing the reliability of power systems, comprising:
   (a) means for developing an analytical model of the power system; and
   (b) means for determining the effect on reliability of at least one of the following: system additions, design alternatives, maintenance practices, substation configurations, and spare part policies; and
   further comprising an overall bulk system reliability analysis means for performing the following substeps:
      determining a study objective, power system model, and equipment cost;
      establishing a base-case system topology;
      modeling a system load;
      defining a contingency list;
      processing a first contingency on said list;
      determining new operating conditions;
      determining whether there are any violations and, if so, modeling relief actions and the cost of relief actions;
      determining reliability indices;
      determining the overall system cost for both equipment and contingency effects; and
      establishing one or more of the following: best alternative, indices, effect of wheeling, effect of operating practices, overall cost of alternative;
   wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

12. A system as recited in claim 11, wherein said violations include transmission line overloads, transformer overloads, voltages below or above specified limits, busbar isolations, system islanding, and reactive power requirements above the available levels.

13. A system as recited in claim 11, wherein said study objective includes a member of the following group: a determination of reliability indices, a determination of the effect of wheeling, an analysis of alternatives, an evaluation of new equipment, an evaluation of operating practices, and an overall system cost determination.

14. A system as recited in claim 11, wherein the means for modeling relief actions and the cost of relief actions comprises means for determining a particular violation type and then performing at least one of the following substeps:
   if the violation type is an overload violation: re-dispatching generation, determining a new generating cost, determining whether there is still an overload violation and, if so, determining the optimum location and amount of load shedding and shedding the real amount of load;
   if the violation type is a voltage violation: reducing the voltage, determining whether there is still an overload violation and, if so, determining the optimum location and amount of load shedding and shedding the real amount of load;
   if the violation type is a reactive power violation, determining the amount of violation; and
   if the violation type is an islanding violation, adjusting the load and generation and then solving each island and relieving the violations;
   wherein step (b) involves a consideration of economic cost of contingencies and economic value of service, said economic cost of contingencies including the cost of unavailability of electric power due to an outage of an element of the power system, and said value of service including the value to a customer of uninterrupted electric power; and wherein contingencies are selected on the basis of a combination of a ranking of contingency severity and a probability of occurrence based on equipment statistics, said contingencies including transmission line overload, transformer overload, voltage above or below prespecified limits, busbar isolation, system islanding, and a reactive power requirement above an available level.

15. A software-based tool for use by an electric utility in planning and operation of its power system, comprising:
   (a) means for prioritizing system design alternatives based on economic cost, severity and probability of occurrence associated with a prescribed set of contingencies resulting in unavailability of electric power due to an outage of an element of the power system;
   (b) means for developing an analytical model of the power system; and (c) means for determining the effect on system reliability and cost of the following: system additions, design alternatives, maintenance practices, substation configurations, and spare parts policies.

16. A tool as recited in claim 15, wherein said prescribed set of contingencies includes at least one member of the group consisting of transmission line overload, transformer overload, voltage above or below prespecified limits, busbar isolation, system islanding, and a reactive power requirement above an available level.

* * * * *

UNITED STATES PATENT AND TRADEMARK OFFICE
CERTIFICATE OF CORRECTION

PATENT NO. : 5,798,939

DATED : August 25, 1998

INVENTOR(S) : J. Rafael Ochoa; Robert L. Hirt

It is certified that error appears in the above-indentified patent and that said Letters Patent is hereby corrected as shown below:

Col. 11, line 10, delete "32"

Col. 19, line 25, "objectives" should read --objective--

Signed and Sealed this

Tenth Day of November 1998

Attest:

BRUCE LEHMAN

*Attesting Officer*  *Commissioner of Patents and Trademarks*